(12) United States Patent
Gallerano et al.

(10) Patent No.: US 8,116,048 B1
(45) Date of Patent: Feb. 14, 2012

(54) ESD PROTECTION FOR DIFFERENTIAL OUTPUT PAIRS

(75) Inventors: Antonio Gallerano, San Jose, CA (US);
Charles Y. Chu, Cupertino, CA (US);
Jeffrey T. Watt, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 258 days.

(21) Appl. No.: 12/577,547

(22) Filed: Oct. 12, 2009

(51) Int. Cl.
*H02H 3/22* (2006.01)
(52) U.S. Cl. .......................................... 361/56; 361/111
(58) Field of Classification Search .................... 361/56, 361/111
See application file for complete search history.

(56) References Cited

U.S. PATENT DOCUMENTS

| 7,190,188 | B2* | 3/2007 | Otsuka et al. | 326/30 |
| 7,974,053 | B2* | 7/2011 | Ker et al. | 361/56 |

* cited by examiner

*Primary Examiner* — Danny Nguyen
(74) *Attorney, Agent, or Firm* — Ward & Zinna, LLC

(57) ABSTRACT

In a conventional differential output circuit, the output terminals are connected to the drains of a differential pair of transistors and the sources of the transistors are connected together at a first node. The bodies of the transistors are connected to a second node having a potential different from that of the first node. In the event of a HBM ESD event, discharge may take place through the differential transistors, leading to destruction of one of them. To reduce the likelihood of such discharge, in a preferred embodiment, switches are provided to connect the body of each of the differential transistors to the first node when an ESD event is sensed. In an alternative embodiment, a switch is provided to connect the first node to the second node when an ESD event is sensed.

18 Claims, 8 Drawing Sheets

ESD PROTECTION FOR DIFFERENTIAL OUTPUT PAIRS

BACKGROUND OF THE INVENTION

This relates to the protection of integrated circuits from electrostatic discharge (ESD). More particularly, it relates to the protection of differential circuits from ESD.

ESD protection has been a main concern in the reliability of integrated circuit products in various sub-micron technologies. ESD is the transient discharge of static charge that can arise from activities such as human handling, machine contact or field-induced charging of a packaged IC. Specific models have been developed to represent these discharges such as the Human Body Model (HBM), the Machine Model (MM), and the Charged Device Model (CDM), respectively. See, for example, A. Amerasekera and C. Duvvury, *ESD in Silicon Integrated Circuits*, pp. 17-40 (2d Ed., Wiley, 2002), which is incorporated herein by reference.

FIG. 1 is a schematic diagram of an illustrative differential circuit 100 with conventional ESD protection circuitry. Differential circuit 100 comprises first and second transistors 110, 130, a clamp transistor 150 and a diode 170. Illustratively, first and second transistors 110, 130 are a low voltage differential signaling (LVDS) output pair. Each transistor 110, 130, 150 is a MOS transistor with a source and drain formed in a body of the transistor and an insulated gate over the body in the region between the source and drain. In the schematic diagram of FIG. 1, the bodies of transistors 110, 130, and 150 are identified as elements 112, 132, 152; the sources are identified as elements 114, 134, 154; the drains are identified as elements 116, 136, 156; and the gates are identified as elements 118, 138, 158, respectively. Sources 114 and 134 are connected together at a source node 190. Resistors 120, 140, 160 are schematic representations of the circuitry between gates 118, 138, 158, respectively, and a common node 180; and resistor 182 is a schematic representation of the circuitry between source node 190 and common node 180. As is known in the art, the actual circuitry represented by these resistors may be considerably more complicated than a simple resistance. Input terminals 122, 142 are connected to gates 118, 138, respectively; and output terminals 124, 144 are connected to drains 116, 136, respectively. Diode 170 may be implemented as a dedicated diode or as the body diode of a MOSFET clamp transistor similar to transistor 150 or as both devices connected in parallel.

As is known in the art, the differential circuit typically comprises several other circuit elements not shown in FIG. 1. For example, transistor 110 is typically driven by circuitry connected to input terminal 122. Additionally, other circuits are connected to output terminal 124 to pull this node up when transistor 110 is in the off state.

Typically, the transistors of differential circuit 100 are NMOS transistors with a P-type body and N-type source and drain regions. As a result, since the P-type body and the N-type source region of each transistor form a first P-N junction and the P-type body and the N-type drain region form a second P-N junction, a parasitic lateral bipolar transistor is present in each transistor. In the event of a positive voltage ESD event on the output terminal 124, circuit 100 is intended to operate so that the second P-N junction of clamp transistor 150 is driven into breakdown and avalanche and the parasitic transistor is triggered into conduction to discharge the ESD pulse.

However, during the ESD event, the body voltage of transistors 110 and 130 can easily float above the source voltage, also making possible bipolar triggering of transistors 110 and 130. For example, as shown in the voltage vs. time plot of FIG. 2A, in the case of a positive ESD event on output terminal 124, the voltages on nodes 180 and 190 will both rise until the voltage on node 180 reaches the threshold voltage of transistor 130 at time t1. Transistor 130 then begins to pull down the voltage at node 190 while the voltage at node 180 is basically pinned at one Vbe above ground by diode 170. While the voltage on node 190 keeps decreasing, the avalanche current in transistor 110 and the voltage at output terminal 124 keep increasing. Eventually, destructive bipolar triggering will occur in transistor 110 when the body-source junction becomes fully forward biased at time t2 leading to a rapid drop in the output voltage. To prevent this, the clamp transistor 150 must trigger before it happens; but it is difficult to assure consistent, timely triggering without significant additional circuitry.

SUMMARY OF THE PRESENT INVENTION

The present invention is an ESD protection circuit that significantly reduces the likelihood of this failure mechanism. In a preferred embodiment of the invention, switches are provided to connect the body of each of the differential transistors to the source node when an ESD event is sensed. In an alternative embodiment, a switch is provided to connect the source node to the common node when an ESD event is sensed.

In the preferred embodiment, each switch is implemented with a pair of transistors. One transistor is a PMOS transistor that is connected between the body of one of the differential transistors and the source node; and the other transistor is an NMOS transistor that is connected between the body and the common node. The gate of the PMOS transistor is connected to the output terminal of the other differential transistor; and the gate of the NMOS transistor is connected to a control voltage.

During normal operation of the differential pair, the NMOS transistors are kept on by the control voltage, thereby connecting the bodies of the differential transistors to the common node. The PMOS transistors are kept off by the common voltage in the output signal. If there is an ESD event on the output terminal of one of the differential transistors relative to the other output terminal, the NMOS transistor connected to the body of that differential transistor is turned off and the PMOS transistor is turned on. As a result, the body of that transistor is disconnected from the common node and connected to the source node In an alternative embodiment, the switches are implemented by a pair of PMOS transistors connected between the source node and the common node. The gate of each of the PMOS transistors is connected to a different one of the output terminals of the differential pair. Again, during normal operation of the circuit the PMOS transistors are kept off by the common voltage in the output signal. If there is an ESD event on the output terminal of one of the differential transistors relative to the other output terminal, one of the PMOS transistors is turned on, thereby connecting the source node and common node and connecting the body to the source node.

BRIEF DESCRIPTION OF THE DRAWINGS

These and other objects and advantages of the present invention will be apparent to those of ordinary skill in the art in view of the following detailed description in which.

DETAILED DESCRIPTION

Figure 1:
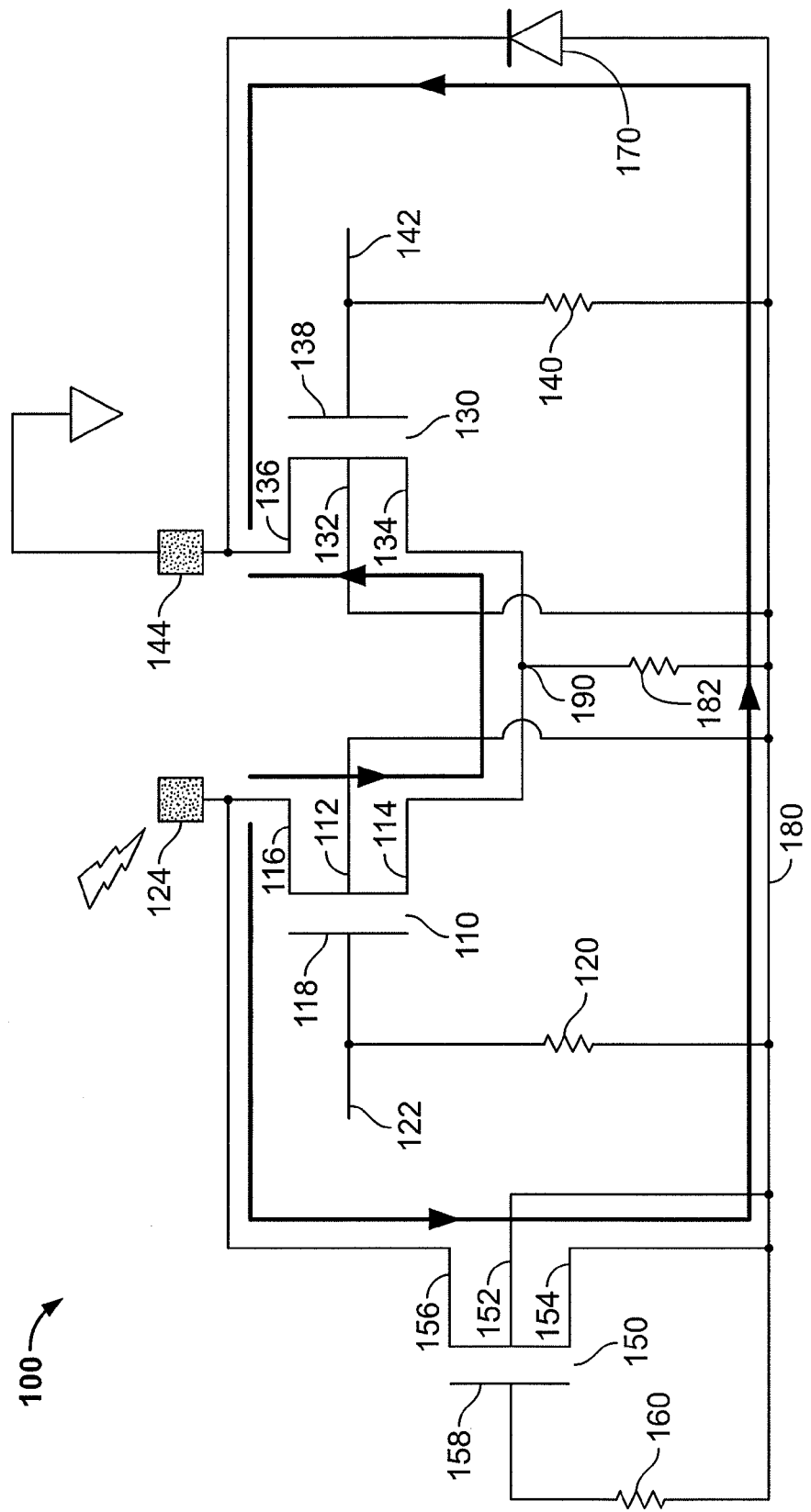
FIG. 1 is a schematic diagram of a differential pair with a conventional ESD protection circuit.
Figure 2A:
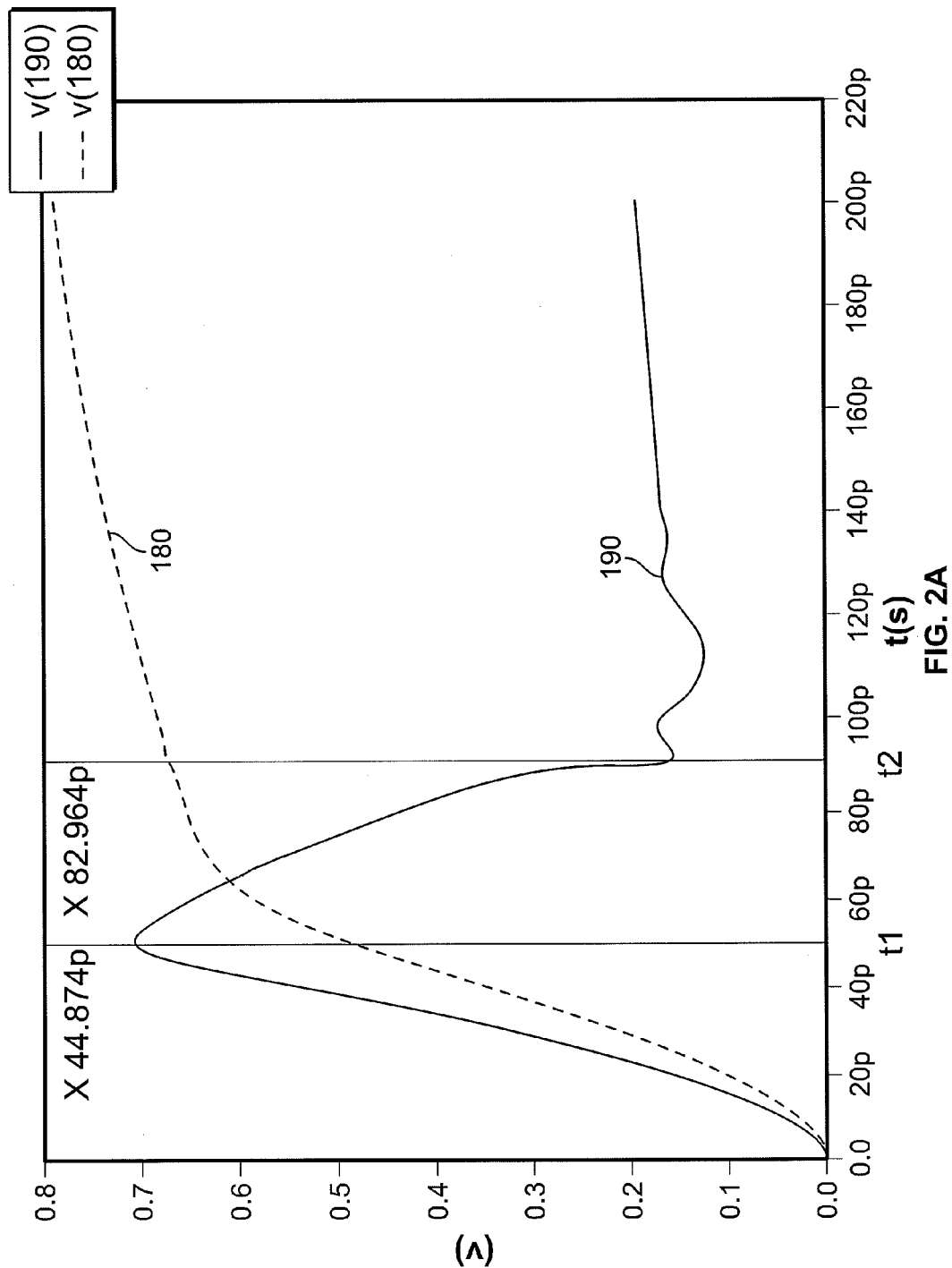
FIGS. 2A-2B are plots of voltage vs. time at various points in the circuit of FIG. 1.
Figure 2B:
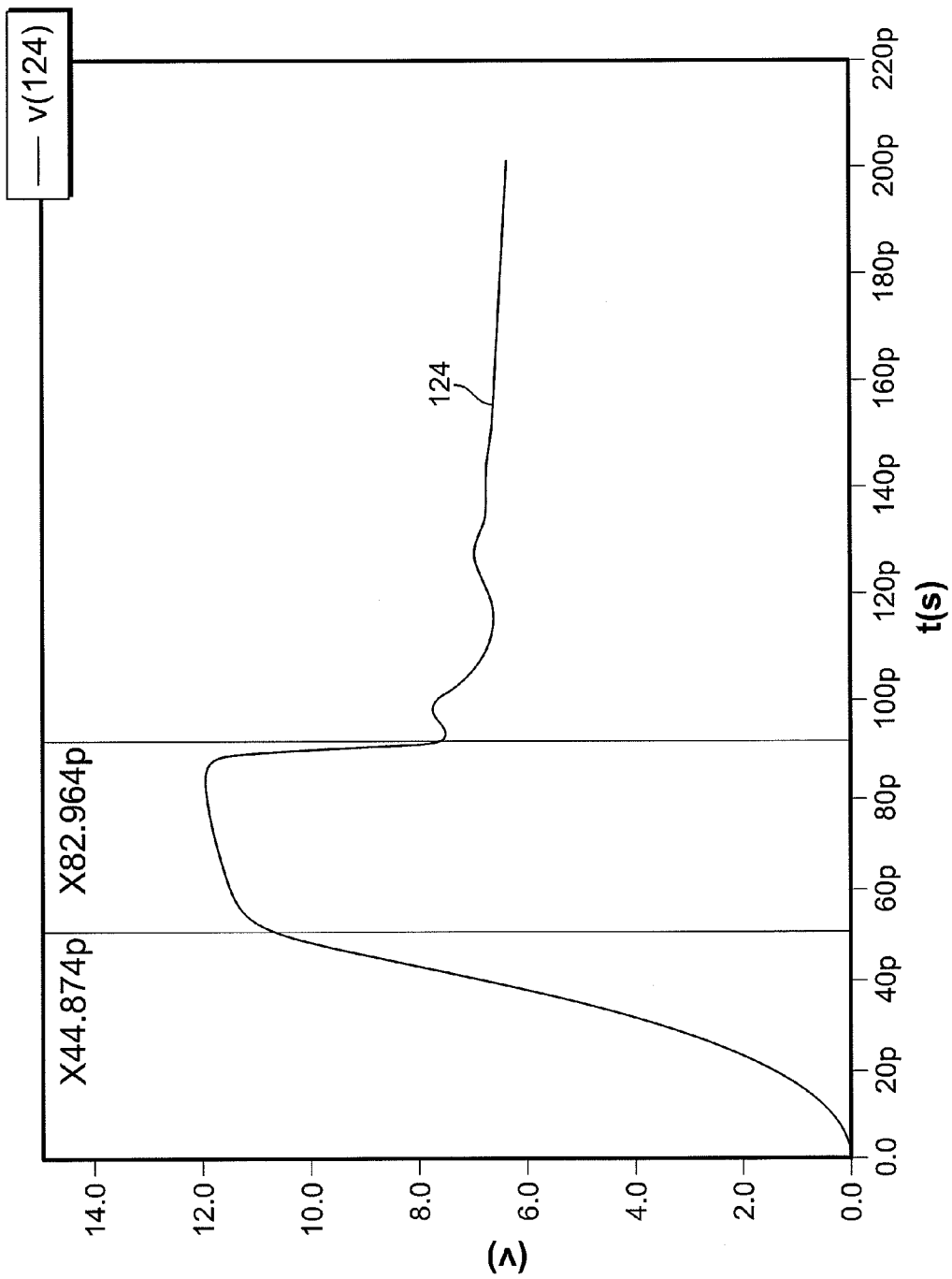
Figure 3:
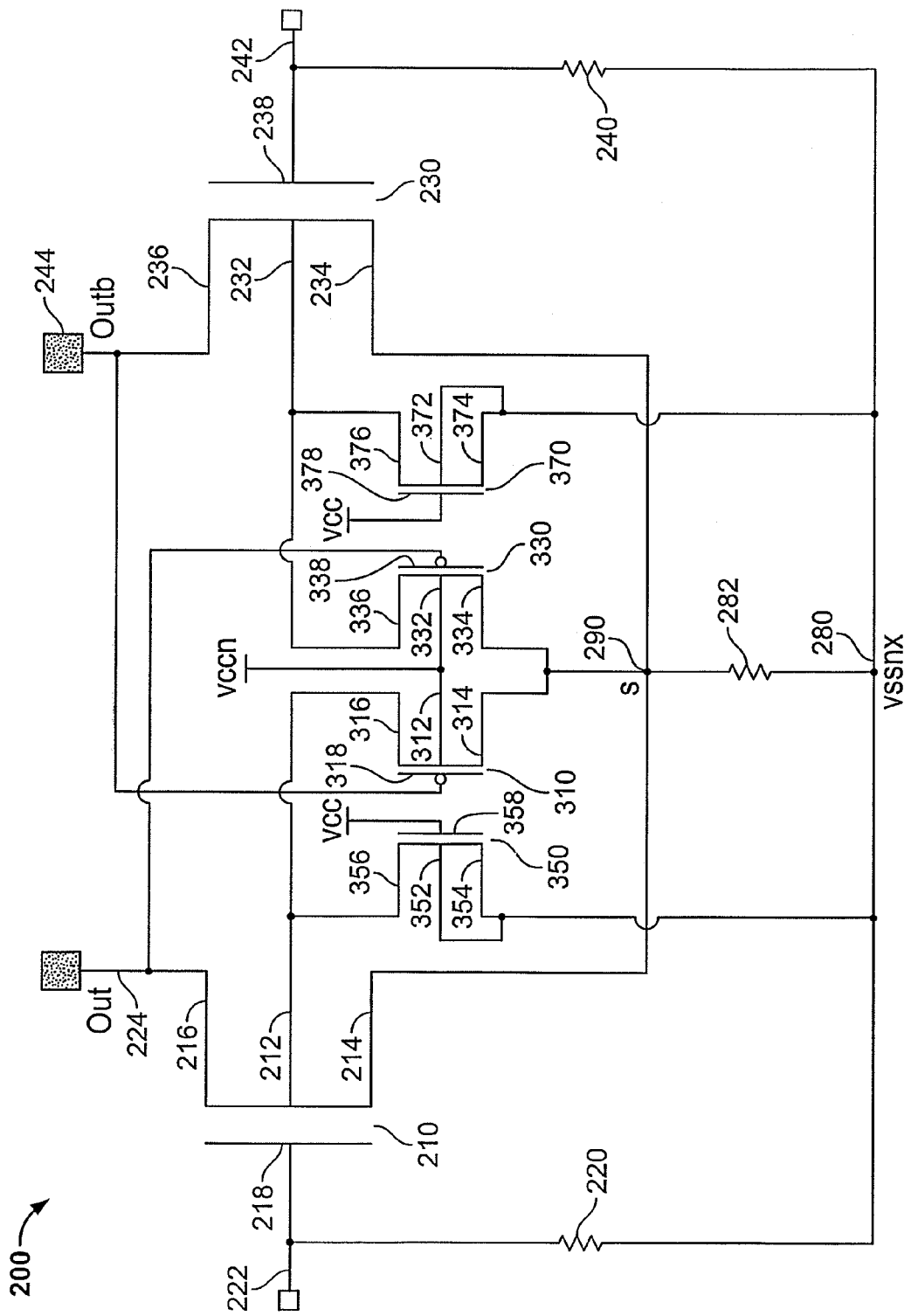
FIG. 3 is a schematic diagram of an illustrative embodiment of the present invention.

FIG. 3 is a schematic diagram of a differential circuit 200 with ESD protection circuitry of the present invention. Differential circuit 200 comprises first and second transistors 210, 230 and a clamp transistor and a diode (not shown) that are substantially the same as clamp transistor 150 and diode 170 of FIG. 1. Illustratively, transistors 210, 230 are a low voltage differential signaling (LVDS) output pair. Each transistor is a MOS transistor with a source and drain formed in a body of the transistor with an insulated gate over the body in the region between the source and drain. In the schematic diagram of FIG. 3, the bodies of transistors 210 and 230 are identified as elements 212, 232; the sources are identified as elements 214, 234; the drains are identified as elements 216, 236; and the gates are identified as elements 218, 238, respectively. Sources 214 and 234 are connected together at a source node 290. Again, resistors 220, 240 are schematic representations of the circuitry between gates 218, 238, respectively, and a common node 280; and resistor 282 is a schematic representation of the circuitry between source node 290 and common node 280. Again, the actual circuitry may be considerably more complicated than a simple resistance. Input terminals 222, 242 are connected to gates 218, 238, respectively; and output terminals 224, 244 are connected to drains 216, 236, respectively. As in the case of the circuit of FIG. 1, the differential circuit typically includes other circuit elements.

In addition, the circuit of FIG. 3 comprises fourth and fifth transistors 310, 330, which illustratively are PMOS transistors, and sixth and seventh transistors 350, 370, which illustratively are NMOS transistors. In the schematic diagram of FIG. 3, the bodies of transistors 310, 330, 350, 370 are identified as elements 312, 332, 352, 372; the sources are identified as elements 314, 334, 354, 374; the drains are identified as elements 316, 336, 356, 376; and the gates are identified as elements 318, 338, 358, 378, respectively. As shown in FIG. 3, the bodies 312, 332 of transistors 310, 330 are connected to a control voltage Vccn; the bodies 352, 372 of transistors 350, 370 are connected to sources 354, 374, respectively; the drains 316, 356 of transistors 310 and 350 are connected to the body 212 of transistor 210; and the drains 336, 376 of transistors 330 and 370 are connected to the body 232 of transistor 230. The gates of transistors 350 and 370 are connected to a control voltage Vcc. The gate of transistor 310 is connected to output terminal 244; and the gate of transistor 330 is connected to output terminal 224.

During normal operation of circuit 200, transistors 350, 370 are kept on by the control voltage Vcc., thereby connecting the bodies 212, 232 of transistors 210, 230 to common node 280. Transistors 310, 330 are kept off by the common voltage in the output signal from the differential pair. If there is an ESD event on the output terminal of one of the differential transistors relative to the other output terminal, the NMOS transistor connected to the body of that differential terminal is turned off and the PMOS transistor is turned on. As a result, the body of that transistor is disconnected from common node 280 and connected to source node 290. For example, if there is an ESD event on output terminal 224, NMOS transistor 350 is turned off while PMOS transistor 310 is turned on, thereby switching the connection of body 212 from common node 280 to source node 290.

Figure 4A:
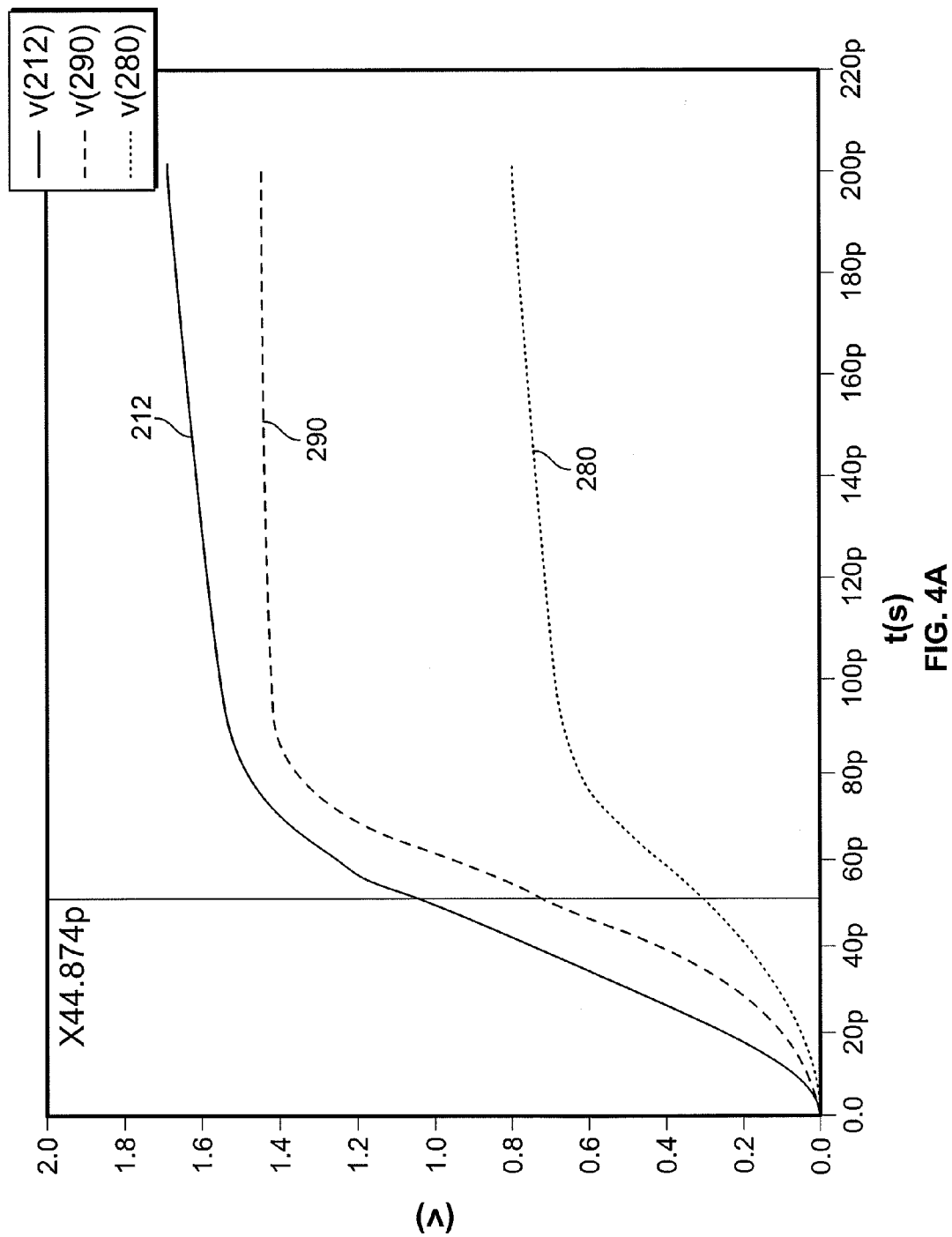
FIGS. 4A-4C are plots of voltage vs. time at various points in the circuit of FIG. 3.
Figure 4B:
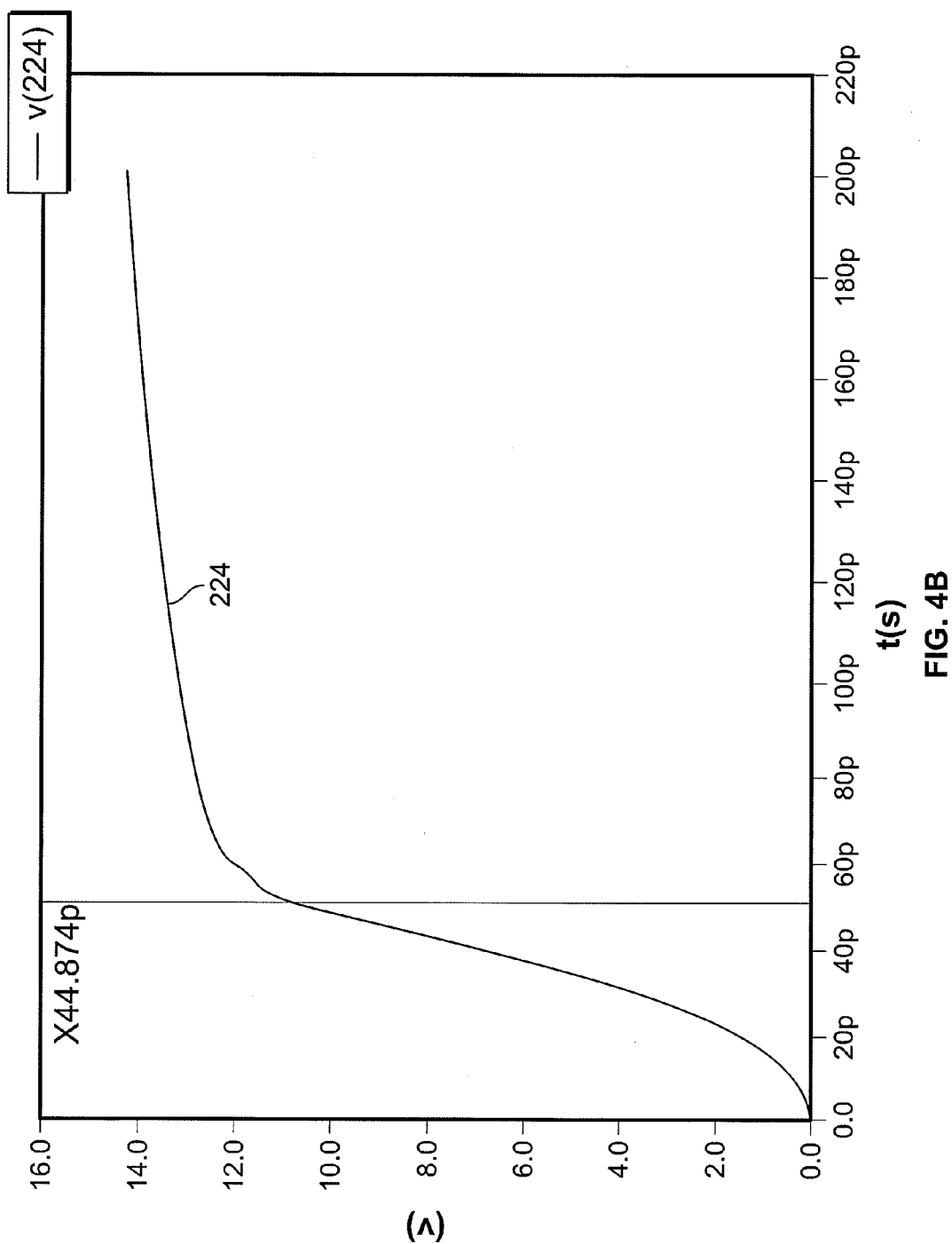
Figure 4C:
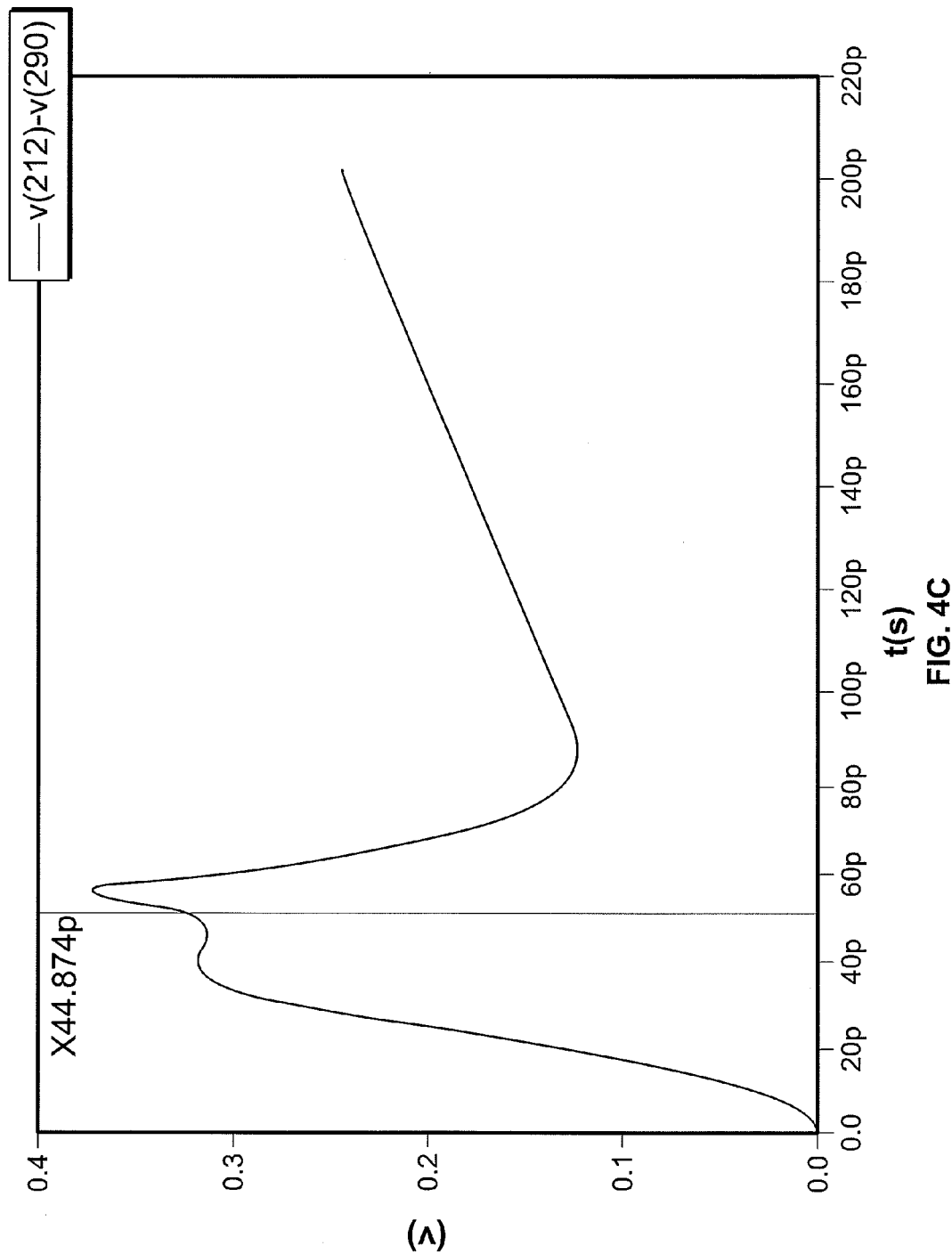

The timing of these steps and their effect on the voltages at various points in the circuit is depicted in the plots of FIGS. 4A-4C which depict a simulation of an HBM ESD event on the circuit. FIG. 4B depicts the voltage at output terminal 224. FIG. 4A depicts the voltage vs. time at body 212, source node 290 and common node 280. FIG. 4C depicts the difference between the voltage at body 212 and source node 290. The vertical line indicates the point in time where the body voltage and the source voltage start to diverge in the circuit of FIG. 1. As can be seen in FIGS. 4A and 4C, the circuit of FIG. 3 holds the body voltage close to the source voltage. And, as can be seen in FIG. 4B the circuit prevents snapback for at least another 150 psec compared to the circuit of FIG. 1, thereby allowing the pad voltage to increase by about 2 more volts compared to that circuit. This, in turn, gives clamp 350 more time to turn on and absorb the energy of the ESD event, thereby diminishing the likelihood of bipolar triggering in the differential transistor.

Figure 5:
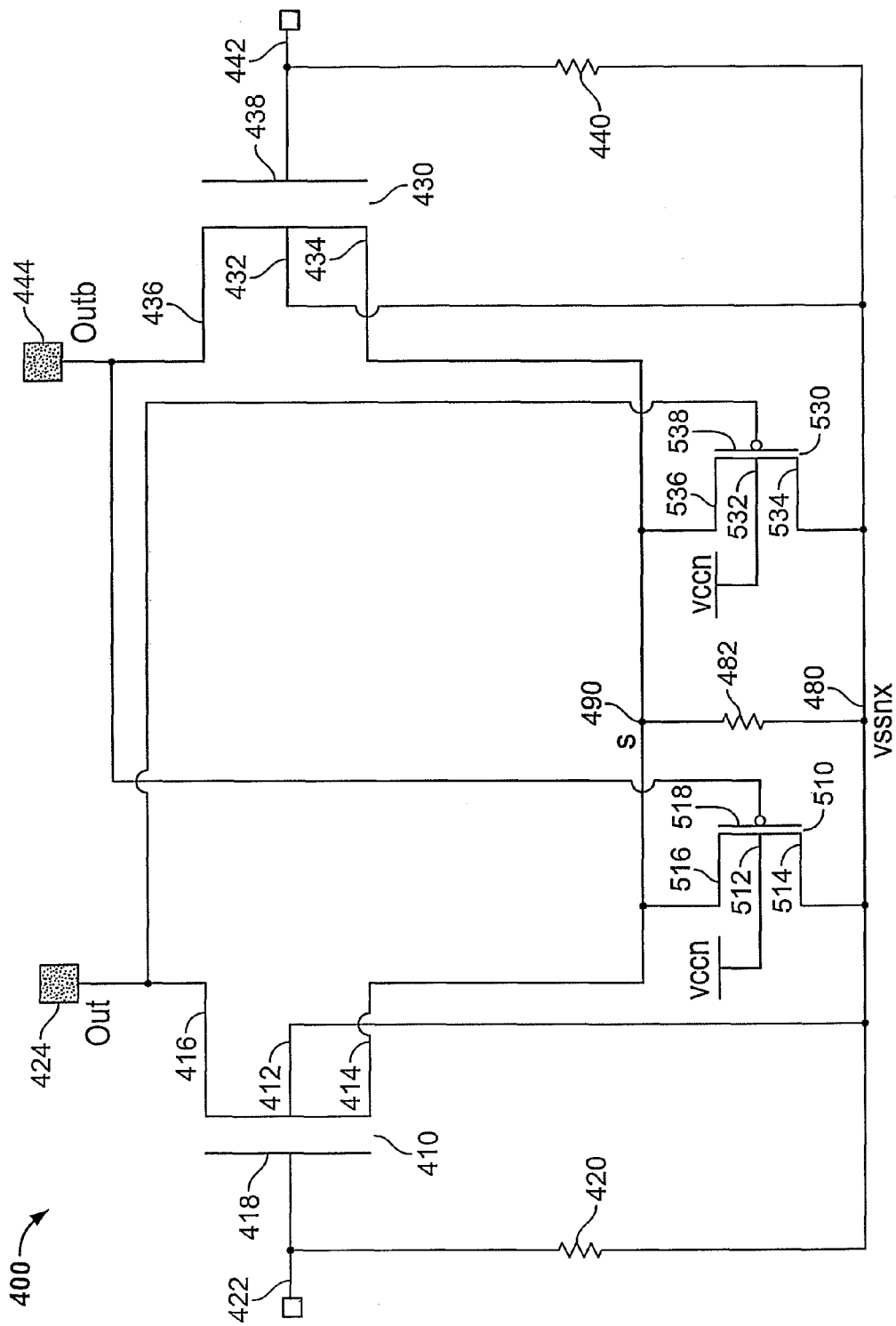
FIG. 5 is a schematic diagram of an alternative implementation of the invention.

FIG. 5 is a schematic diagram of a differential circuit 400 with ESD protection circuitry of the present invention. Again, differential circuit 400 comprises first and second transistors 410, 430 and a clamp transistor and a diode (not shown) that are substantially the same as clamp transistor 150 and diode 170 of FIG. 1. Illustratively, first and second transistors 410, 430 are a low voltage differential signaling (LVDS) output pair. Each transistor is a MOS transistor with a source and drain formed in a body of the transistor with an insulated gate over the body in the region between the source and drain. In the schematic diagram of FIG. 5, the bodies of transistors 410 and 430 are identified as elements 412, 432; the sources are identified as elements 414, 434; the drains are identified as 416, 436; and the gates are identified as 418, 438, respectively. Sources 414 and 434 are connected together at a source node 490. Again, resistors 420, 440 are schematic representations of the circuitry between gates 418, 438 and a common node 480; and resistor 482 is a schematic representation of the circuitry between source node 490 and common node 480. The actual circuitry may be considerably more complicated than a simple resistance. Input terminals 422, 442 are connected to gates 418, 438, respectively; and output terminals 424, 444 are connected to drains 416, 436, respectively. As in the case of the circuits of FIGS. 1 and 3, differential circuit 400 typically includes other circuit elements as well.

In addition, the circuit of FIG. 5 comprises fourth and fifth transistors 510, 530, which illustratively are PMOS transistors. In the schematic diagram of FIG. 5, the bodies of transistors 510, 530 are identified as elements 512, 532; the sources are identified as elements 514, 534; the drains are identified as elements 516, 536; and the gates are identified as elements 518, 538, respectively. As shown in FIG. 5, the bodies 512, 532 of transistors 510, 530 are connected to a control voltage Vccn; the sources 514, 534 of transistors 510, 530 are connected to node 480; and the drains 516, 536 of transistors 510 and 530 are connected to source node 490. The gate of transistor 510 is connected to output terminal 444; and the gate of transistor 530 is connected to output terminal 424.

During normal operation of circuit 400, transistors 510, 530 are kept off by the common voltage in the output signal from the differential pair. If there is an ESD event on the output terminal of one of the differential transistors relative to the other output terminal, one of transistors 510, 530 is turned on thereby connecting common node 480 to source node 490 and connecting together the bodies 412, 432 and sources 414, 434 of transistors 410, 430. As a result, the voltage at source node 490 will again remain close to the voltage at common node 480 during an ESD event and the risk of bipolar triggering the one of the differential transistors will be diminished.

While circuit 400 of FIG. 5 has the advantage that it can be implemented with only two additional transistors more than in a conventional circuit instead of the four additional transistors of circuit 200 of FIG. 3, it is not preferred because the two additional transistors must be significantly larger because they operate at a reduced Vgs during an ESD event. Illustratively, PMOS transistors 310, 330 have a width/length (W/L) ratio of 100 µm/0.27 µm and NMOS transistors 350, 370 have a W/L ration of 30 µm/0.04 µm. While these ratios were used in simulating the circuit performance depicted in FIGS. 3A-3C, it must be emphasized that they are only examples. It is likely that any final design would employ minimum length and that the final widths would be chosen to optimize circuit performance.

As will be apparent to those skilled in the art, numerous variations may be practiced within the spirit and scope of the present invention.

What is claimed is:

1. A differential output circuit with electrostatic discharge (ESD) protection comprising:
    first and second MOS transistors, each having a body in which are formed source and drain regions and a gate, the drain regions being connected to differential output terminals and the source regions being connected together at a first node, and
    a first switch for connecting a body of one of the first and second transistors to a second node having a potential lower than the first node when the circuit is producing a differential output and to the first node when an ESD event is present.

2. The differential output circuit of claim 1 wherein the second node is at ground potential when the circuit is producing a differential output.

3. The differential output circuit of claim 1 wherein the first switch comprises third and fourth transistors, each connected to the body of one of the first and second transistors, the third transistor connecting the body to the second node when the circuit is producing a differential output and the fourth transistor connecting the body to the first node when an ESD event is present.

4. The differential output circuit of claim 3 wherein the third transistor is a NMOS transistor and the fourth transistor is a PMOS transistor.

5. The differential output circuit of claim 4 wherein a gate of the PMOS transistor is connected to an output terminal of the other of the first and second transistors.

6. The differential output circuit of claim 1 further comprising a second switch for connecting a body of the other of the first and second transistors to the second node when the circuit is producing a differential output and to the first node when an ESD event is present.

7. The differential output circuit of claim 6 wherein the first switch comprises third and fourth transistors, each connected to the body of the first transistor, the third transistor connecting the body to the second node when the circuit is producing a differential output and the fourth transistor connecting the body to the first node when an ESD event is present and the second switch comprises fifth and sixth transistors, each connected to the body of the second transistor, the fifth transistor connecting the body to the second node when the circuit is producing a differential output and the sixth transistor connecting the body to the first node when an ESD event is present.

8. The differential output circuit of claim 7 wherein the third and fifth transistors are NMOS transistors and the fourth and sixth transistors are PMOS transistors.

9. The differential output circuit of claim 8 wherein the gate of the fourth transistor is connected to an output terminal of the second transistor and the gate of the sixth transistor is connected to an output terminal of the first transistor.

10. The differential output circuit of claim 1 wherein the first and second transistors are a low voltage differential signaling (LVDS) output pair.

11. A differential output circuit with electrostatic discharge (ESD) protection comprising:
    first and second MOS transistors, each having a body in which are formed source and drain regions and a gate, the drain regions being connected to differential output terminals, the source regions being connected together at a first node, and the bodies being connected to a second node having a potential lower than the first node when the circuit is producing a differential output, and
    a first switch for connecting the first node to the second node when an ESD event is present.

12. The differential output circuit of claim 11 wherein the first switch is at least one transistor connected between the first node and the second node.

13. The differential output circuit of claim 11 wherein the first switch comprises third and fourth transistors each connected between the first node and the second node, a gate of the third transistor being connected to an output terminal of the first transistor and a gate of the fourth transistor being connected to an output terminal of the second transistor.

14. The differential circuit of claim 13 wherein the third and fourth transistors are PMOS transistors.

15. The differential circuit of claim 11 wherein the first and second transistors are a low voltage differential signaling (LVDS) output pair.

16. A method of providing electrostatic discharge (ESD) protection of a circuit comprising first and second MOS transistors, each having a body in which are formed source and drain regions and a gate, the drain regions being connected to differential output terminals and the source regions being connected together at a first node, said method comprising the steps of:
    connecting the bodies to a second node having a potential lower than the first node when the circuit is producing a differential output, and
    connecting at least one body to the first node when an ESD event is present.

17. The method of claim 16 wherein both bodies are connected to the first node when an ESD event is present.

18. The method of claim 16 wherein the first and second transistors are a low voltage differential signaling (LVDS) output pair.

* * * * *